United States Patent [19]
Julius et al.

[11] Patent Number: 4,479,574
[45] Date of Patent: Oct. 30, 1984

[54] CONTAINER TRANSPORT APPARATUS

[75] Inventors: Richard F. Julius, Silver Spring, Md.; John C. Lund, Springfield, Va.

[73] Assignee: S. J. Industries, Inc., Alexandria, Va.

[21] Appl. No.: 370,470

[22] Filed: Apr. 21, 1982

[51] Int. Cl.³ .............................................. B65G 15/14
[52] U.S. Cl. .................................. 198/626; 134/125; 198/841
[58] Field of Search ............... 198/405, 400, 399, 626, 198/627, 628, 841, 840; 134/125, 127

[56] References Cited

U.S. PATENT DOCUMENTS

| | | | |
|---|---|---|---|
| 2,929,489 | 3/1960 | Parrish | 198/405 |
| 3,164,245 | 1/1965 | Juengel | 198/841 |
| 3,289,818 | 12/1966 | Kittredge | 198/841 |
| 3,507,380 | 4/1970 | Sarovich et al. | 198/841 |
| 3,767,028 | 10/1973 | Rosso | 198/405 |
| 3,802,549 | 4/1974 | Kinsey | 198/627 |
| 3,978,979 | 9/1976 | Mezey | 198/626 |
| 4,208,761 | 6/1980 | Ionescu | 198/399 |

FOREIGN PATENT DOCUMENTS 55567 11/1974 Australia ............................ 198/405

Primary Examiner—Joseph E. Valenza
Assistant Examiner—Daniel R. Alexander
Attorney, Agent, or Firm—Michael W. York

[57] ABSTRACT

Container transport apparatus for transporting containers such as plastic bottles and the like which are subject to damage without damaging the containers. The container transport apparatus includes container guiding members for guiding containers such as plastic bottles through a bottle rinser or the like and elongated endless belt members for contacting the sides of the containers to move the containers along the path of the container guiding members. The container transport apparatus eliminates the problems associated with conventional bottle rinsers and the like when used with non-rigid bottles.

8 Claims, 8 Drawing Figures

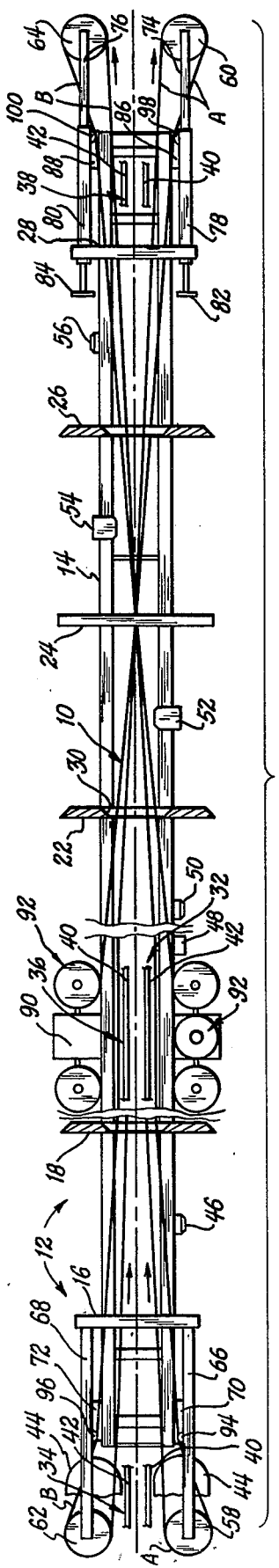

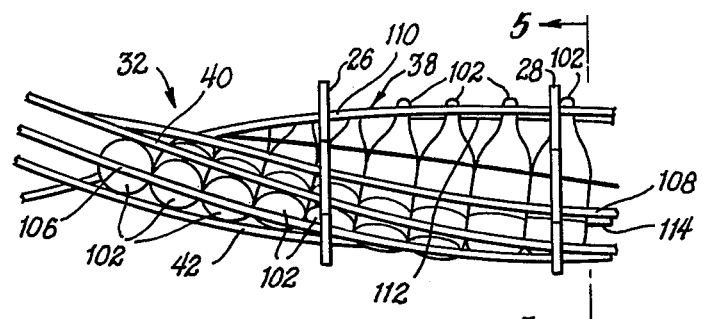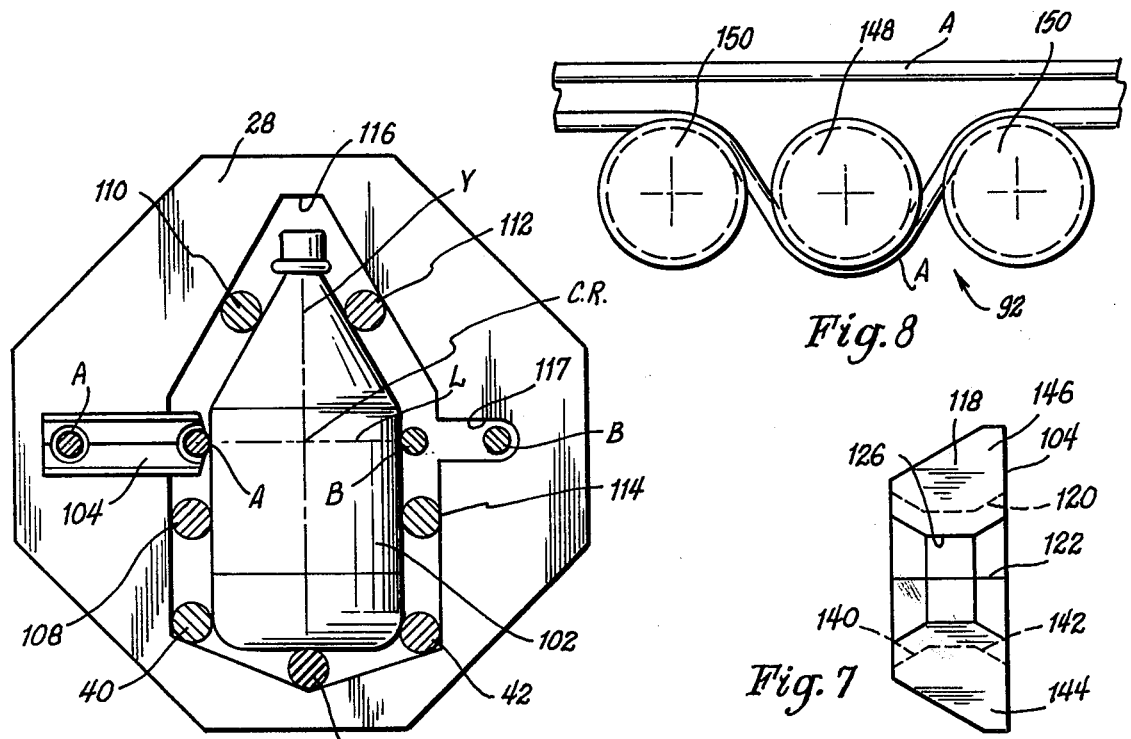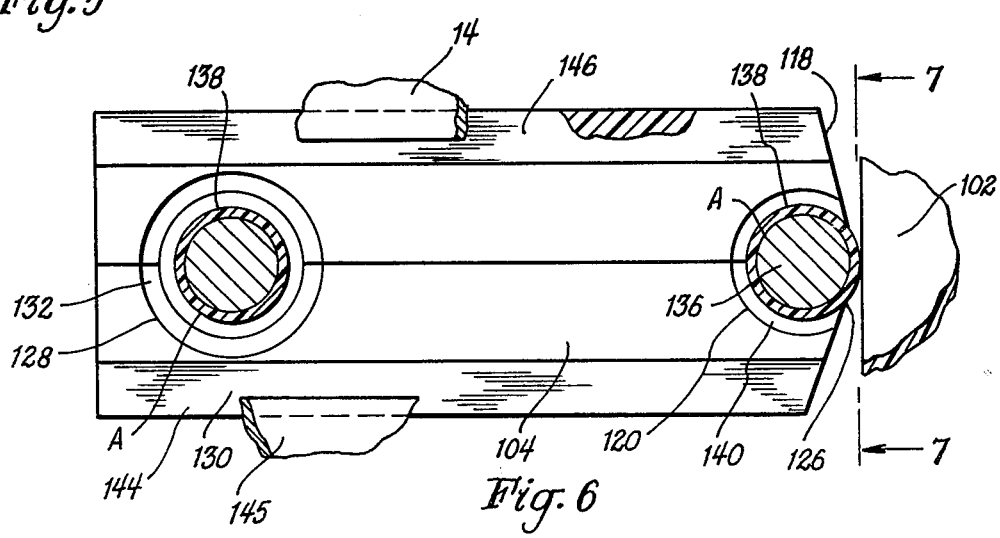

CONTAINER TRANSPORT APPARATUS

BACKGROUND OF THE INVENTION

Containers such as bottles and the like have been used for many years to contain liquids and the like to protect the contents while the bottles are being stored or offered for sale. These bottles have included returnable bottles and the nonreturnable bottles. For obvious sanitary reasons these bottles had to be cleaned and/or rinsed prior to being filled or refilled and the systems and methods of cleaning or rinsing such bottles are well developed and in general gave good results. The bottles handled by such systems were normally made from glass and since glass is strong systems for transporting these bottles utilized the strength of the bottles to assist in transporting the bottles.

For instance in the soft drink, beer and other similar industries bottles are usually rinsed before being filled. The rinser apparatus most commonly used is one that accepts empty bottles from a conveyor line and by means of a drive system, applies a forward axial force to one bottle at a time. This bottle is in contact with the preceeding one which is in contact with the one in front of it and so on through the length of the rinser. Hence the force applied at the drive system is transmitted from one bottle to the next by direct contact forcing the bottles to move through a cradling device known as a twist. The twist is made of guide rails which are twisted to make the bottles turn upside down and then right side up as they move through the rinser while water is sprayed in the bottles and then allowed to drain.

With the advent of the thin walled plastic bottles, the previously described system does not perform well for various reasons. For instance, a large force cannot be applied at the entrance drive to obviate a downstream obstruction, since the plastic bottles tend to be crushed. Another problem is that plastic bottles frequently are distorted on the conveyor entering the drive system, and since the drive is set to slightly squeeze the bottles in order to apply an axial force a distortion prevents the squeezing and hence the axial force from being applied. Another common problem is an obstruction at the downstream portion which prevents movement of the plastic containers may cause the containers upstream from the obstruction to be crushed if the drive force is sufficient.

In summary, the present bottle transport systems require strong bottles such as glass bottles since the bottles must be distortion free to properly function in the systems. Consequently, these systems cannot properly handle the modern plastic bottles.

The present invention overcomes these deficiencies associated with bottle transport systems for use with bottle rinsers and the like and permits plastic bottles to be readily transported without being crushed or distorted. Moreover, the invention is capable of being used with present systems by merely modifying these systems to accomodate the invention.

BRIEF DESCRIPTION OF THE INVENTION

This invention relates to bottle transport apparatus and the like and more particularly to container transport apparatus which are particularly useful in transporting non-rigid or plastic types of bottles.

Accordingly it is an object of the present invention to provide transport apparatus for transporting non-rigid containers such as plastic bottles or the like.

It is an object of the present invention to provide transport apparatus which does not require the transmittal of forces from one container to the next.

It is an object of the present invention to provide transport apparatus which greatly reduces the possibility of damage to the containers being transported.

It is also an object of the present invention to provide transport apparatus which only requires light forces to be applied to the containers being transported.

It is also an object of the present invention to provide transport apparatus which is capable of preventing damage to the containers being transported when the path of the containers is obstructed.

It is also an object of the present invention to provide container transport apparatus which can be used when the containers are rotated upside down and then right side up.

It is also an object of the present invention to provide container transport apparatus which does not crush the containers.

It is an object of the present invention to provide container transport apparatus which is particularly useful in container rinsers for crushable containers.

It is an object of the present invention to provide container transport apparatus which is particularly useful in bottle rinsers for plastic bottles.

It is an object of the present invention to provide container transport apparatus which maintains substantially continuous contact with each container.

It is an object of the present invention to provide container transport apparatus which transports the containers in a uniform manner.

It is an object of the present invention to provide container transport apparatus which can handle moderately damaged containers.

It is an object of the present invention to provide bottle transport apparatus which can be used in conjunction with standard type bottle rinser apparatus.

It is an object of the present invention to provide bottle transport apparatus which can be used to retrofit existing bottle rinser apparatus.

It is an object of the present invention to provide bottle transport apparatus which can be easily installed on existing bottle rinser apparatus.

It is also an object of the present invention to provide bottle transport apparatus which is reliable in operation.

It is also an object of the present invention to provide bottle transport apparatus which requires little servicing.

The present invention provides transport apparatus for transporting containers such as plastic bottles and the like which are subject to damage comprising guide means for guiding the containers and means for moving the containers without exerting forces on the containers to subject the containers to possible damage.

BRIEF DESCRIPTION OF THE DRAWINGS

The invention will be hereinafter more fully described with reference to the accompanying drawings in which:

FIG. 1 is a top plan view of a bottle rinser incorporating the present invention with certain portions thereof removed for clarity;

FIG. 2 is a side elevational view of the structure illustrated in FIG. 1 with notations indicating the location of belt guides and the angle the bottle would be at from its vertical or upright position;

FIG. 3 is a series of end or sectional views indicating the location of the bottle and belt guides at the various stations set forth in FIG. 2;

FIG. 4 is an enlarged view of a portion of the structure illustrated in FIG. 2 with certain portions removed for clarity but illustrating the guide rails which were omitted from the structure set forth in FIG. 2;

FIG. 5 is an enlarged sectional view of structure set forth in FIG. 4 taken on the line 5—5 thereof;

FIG. 6 is an enlarged view of a belt guide member which forms part of the sturcture illustrated in FIG. 5;

FIG. 7 is an end view of the structure illustrated in FIG. 6 taken in the direction of the line 7—7 thereof; and FIG. 8 is an enlarged view of a portion of the belt drive structure illustrated in FIG. 1.

DETAILED DESCRIPTION OF THE PREFERRED EMBODIMENT

Referring first to FIGS. 1 and 2, the container transport apparatus of the invention is illustrated and is designated generally by the number 10. The container transport apparatus 10 forms part of a bottle rinser designated generally by the number 12 as illustrated. For clarity portions of the bottle rinser 12 have been omitted as have any bottles. The container transport apparatus 10 comprises a generally rectangular frame support structure 14 and substantially flat guide support members such as the guide support members 16, 18, 22, 24, 26 and 28 which extend upwardly from the frame support structure 14 and have their lower portions rigidly connected to the frame support structure 14. Each of these guide support members 16, 18, 22, 24, 26 and 28 have a centrally located aperture such as the aperture 30 in the guide member 22. The apertures such as the aperture 30 are sized and shaped to suitably receive containers such as bottles which will be hereinafter described and in addition container guide means designated generally by the number 32.

The container guide means 32 comprises an input twist portion 34, an intermediate portion 36 located adjacent to the input twist portion 34 and an output twist portion 38 located adjacent the intermediate portion 36. The container guide means 32 comprises a series of rigid elongated container guide members only two of which are shown in FIGS. 1 and 2 for clarity and are designated by the numbers 40 and 42. These container guide members such as the members 40 and 42 are straight in the intermediate portion 36, but they are appropriately twisted in the input and output twist portion 34 and 36 so that the containers such as bottles are first twisted to an inverted position in the input twist portion 34, then held in the inverted position in the intermediate portion 36 and then twisted to the upright position in the output twist portion 38 since the elongated guide members of the container guide means 32, such as the members 40 and 42 surround and cradle the containers as they pass through the rinser 12.

A conventional drive belt assembly feeds containers such as bottles or the like into the input twist portion 34 and a portion of this drive belt assembly is shown in FIGS. 1 and 2 and is designated by the number 44. This inlet drive assembly 44 exerts forward pressure on the containers and forces them into the input twist portion 34. In a conventional rinser, the force exerted by the drive belt assembly 44 would be transmitted from one adjacent container such as a bottle or the like to the next adjacently located container since they would be in wall to wall contact with each other and hence the inlet drive assembly 44 would push the bottles or the like through the input twist portion 34, through the intermediate portion 36, and through the output portion 38 and out of the output portion 38. As this occurs, the bottles or the like would first be rinsed and then drained in a conventional manner through the use of conventional nozzles, etc. which have been omitted for clarity.

This procedure works satisfactorily for conventional bottles and other containers with strong walls which can withstand the sideward forces exerted upon them by the inlet drive assembly 44. However, this procedure is unsatisfactory with plastic bottles or other containers having non-rigid side walls which cannot handle the forces exerted on their side walls due to the inlet drive assembly 44. Thus, far the apparatus that has been described is in itself conventional and can be found in existing bottle rinsers including the WR series of bottle rinsers available from S. J. Industries, Inc. of Alexandria, Va. Many portions of the rinser 12 including but not limited to the enclosure for surrounding the bottles being rinsed and drained, and the motor for driving the inlet drive assembly 44 have been omitted for clarity since they are conventional and are not necessary for an understanding of the invention.

As illustrated in FIGS. 1 and 2, belt guide support members such as the belt guide support members 46, 48, 50, 52, 54 and 56 extend upwardly from the frame support structure 14. These belt guide support members and the members 16, 18, 22, 24, 26 and 28 serve to support and locate belt guide members which will be hereinafter discussed in detail. An endless elongated member or belt A passes around a pulley 58 located at one end and on one side of the bottle rinser apparatus 12 and around another pulley 60 located at the other end and on the same side of the bottle rinser apparatus 12. In a similar manner, another substantially identical endless elongated member or belt B passes around a pulley 62 located at one end and on the opposite side from the pulley 58 of the bottle rinser apparatus 12 and around another pulley 64 located at the other end of the bottle rinser apparatus 12 opposite from the pulley 60. These belts A and B extend for the full length of the guide means 32.

The pulleys 58 and 62 are rotatably connected to the outer end portion of the respective projecting pulley support arm members 66 and 68 which are in turn connected to the respective arm support members 70 and 72 which extend upward from the frame support structure 14. In a somewhat similar manner the pulleys 60 and 64 are rotatably connected to the outer end portion of the respective projecting pulley support arm members 74 and 76 whose respective inner end portions are located telescopically within the respective elongated housings 78 and 80 and are movable inwardly and outwardly with respect to the elongated housings 78 and 80 by means of the adjusting wheels 82 and 84 which are respectively rotatably connected to the housings 78 and 80. The housings 78 and 80 are in turn connected to the respective housing support members 86 and 88 whose lower portions are connected to the frame support structure 14. In view of the foregoing, the tension on the respective belts A and B can be increased or decreased by appropriately turning the respective adjusting wheels 82 and 84.

It will also be noted that two substantially identical small pulleys 94 and 96 are rotatably connected to the respective arm members 66 and 68 and two substantially identical small pulleys 98 and 100 are rotatably connected to the respective elongated housings 78 and 80. The purpose of these pulleys 94 and 98 and 96 and 100 is to push a portion of returning portion of the respective belts A and B inwardly where the returning portions can be properly guided in a manner which will be hereinafter described in detail.

Two identical hydraulic motors 90 are located on the outside frame of the support structure opposite each other and serve to drive the belts A and B through a belt drive system 92 which will be hereinafter described in detail. For clarity, only one of the hydraulic motors 90 is shown in FIGS. 1 and 2.

FIGS. 2 and 3 illustrate how the container transport apparatus assists containers such as the bottle 102 through the bottle rinser 12. The letters A and B located on a line beneath the bottle rinser apparatus 12 indicate that a belt guide for either cable A (indicated by the letter "A") or a belt guide for cable B (indicated by the letter "B") is present at that location along the length of the bottle rinser apparatus 12. The degree indications located below the line of letters A and B indicate the degrees that the bottle 102 has been rotated from its vertical upright position at that given location along the length of the bottle rinser 12. FIG. 3 illustrates the portion of the bottle 102 when looking at the bottle in the direction F in FIG. 2 or viewing it from the rear as the bottle progresses through the bottle rinser 12. The rotation of the bottle 102 from its upright position also corresponds to the degrees of rotation indicated above each bottle 102 which are set forth in FIG. 2. In addition, FIG. 3 illustrates the location of a portion of a belt guide member 104 for the belt B and the location of the belt A.

As indicated in FIGS. 1, 2 and 3, the bottle 102 enters the input twist portion 34 of the guide means 32 in an upright position with its long axis Y substantially perpendicular to the horizontal plane. The bottle 102 is then rotated clockwise or to the right when viewing the bottle 102 from the rear as it progresses through the input twist portion 34. It will be noted that the position of the belt guide member 104 for the belt B is always located so that the portion of the belt B that it is guiding contacts the side of the bottle at a point substantially on a line L that is substantially perpendicular to the long axis Y of the bottle 102 and which passes through the center of rotation C.R. of the bottle 102 as it passes through the guide means 32.

It will also be noted that the other belt A contacts the opposite wall of the bottle 102 at a point substantially opposite the point where the other belt B contacts the wall of the bottle 102. What has been said with respect to the belt guide member 104 for the belt B also applies to the belt guide member 104 for the belt A. However, as illustrated in FIG. 2 by the line of A's and B's which designate the locations of the belt guide members 104 for the belts A and B, the belt guide members 104 for the belt A alternate with the belt guide members 104 for the belt B so that a belt guide member 104 for the belt A is followed by a belt guide member 104 for the belt B which is then followed by a belt guide member 104 for the belt A and so on. This is necessary in order to obtain even pressure forces on the bottle 102 instead of pressure points which could occur if both the belt guide members 104 were located substantially opposite each other. For clarity the belt guide members 104 for the belt A have been omitted from FIG. 3.

As illustrated in FIG. 3, the bottle 102 continues to rotate clockwise or to the right as it passes through the input twist portion 34 until the bottle 102 is substantially inverted or has been rotated 180 degrees as it enters the intermediate portion 36 of the guide means 32. The bottle 102 continues in this substantially inverted position as it passes through the intermediate portion 36 where it is permitted to drain during at least a portion of its travel through the intermediate portion 36.

As illustrated in FIG. 3 the bottles such as the bottle 102 leave the intermediate portion 36 they are inverted, but after the bottle 102 enters the output twist portion 38 it is rotated from its inverted position clockwise as viewed from the rear of the bottle 102 to its upright position as it leaves or is about to leave the output twist portion 38. As the bottle 102 exits the output twist portion 38 it would enter a conventional conveyor system or the like which is not shown.

FIG. 4 is an enlarged view of a portion of the output twist portion 38 of the container guide means 32 and associated structure illustrated in FIG. 2, but showing the bottles 102 and additional guide members which were omitted from FIG. 2 for clarity. In FIG. 4 the previously discussed container guide members 40 and 42 of the container guide means 32 are illustrated as are the guide support members 26 and 28. As illustrated in addition to the elongated container guide members 40 and 42 the container guide means also comprises rigid elongated container guide members 106, 108, 110, 112 and 114. These container guide members 40, 42, 106, 108, 110, 112 and 114 surround the containers such as the bottles 102 and guide them as they pass through the bottle rinser 12. As indicated, the bottles 102 are substantially in wall to wall contact with each other as they pass through the container guide means 32.

FIG. 5 is an enlarged view of the structure illustrated in FIG. 4 taken on the line 5—5 thereof. As illustrated, the guide support member 28 has an aperture 116 for permitting the containers such as the bottles 102 to pass therethrough and the substantially circular cross section guide members 104 are connected to the edges of the aperture 116 at suitable locations by welding or by conventional adjustable means so as to guide the bottles 102 through the aperture 116. As illustrated, a belt guide member 104 is connected at a suitable location by conventional adjustable means such as welding to the guide support member 28 so that the belt A which is guided by this guide support member 104 is substantially located on the line L which intersects the center of rotation C.R. of the bottles 102. In addition, the opposite belt B contacts the opposite wall of bottle 102 at a point substantially opposite the point of contact of the belt portion A. Provision is also made in the guide support member by means of a cut out portion or aperture 117 which permits passage of the return portion of the belt B. It should be noted that the portions of the belts A and B contact the walls of the bottle substantially opposite each other on a line L which substantially intersects the center of rotation C.R. of the bottles 102.

FIGS. 6 and 7 illustrate enlarged views of the belt guide members 104 such as the member illustrated in FIG. 5. The belt guide member 104 comprises a generally flat rectangular structure with a sloping end portion 118 which has a circular aperture 120 extending through it which forms part of a circle. The guide member 104 can be made from any suitable plastic such as Teflon or the like. The outer portion of the circular aperture 120 is cut away or has an opening 126 which permits a portion of the belt A or B (with the portion of the belt A being shown) to project outside the outer surface of the sloping end portion 118 of the belt guide member 104 and hence contact the side wall of the container such as the bottle 102.

Another aperture or hole 128 extends through the belt guide member 104 at the inner end portion 130 which is opposite the sloping end portion 118. This hole 128 is larger in diameter than the diameter of the belt A and larger in diameter than the hole 120 since its only purpose is to generally guide the returning or non-driving portion of the belt A whereas the hole 120 not only guides the advancing portion of the belt A but pushes it up against the side of the bottle 102. Of course, a suitable hole (not shown) must be made in the adjacent portion of the guide support member 28 or space allowed to permit passage of the returning portion of the cable A which passes through the hole 128. Of course, what has been said with respect to cable would also apply to cable B and the belt guide members 104 associated with cable B.

As illustrated in FIGS. 6 and 7, the hole 120 has a chamfer or sloping surface 140 and 142 at its respective forward and aft entrances which serve to reduce friction between the hole and the cable such as the cable A. In a similar manner, the hole 128 also has a chamfer or sloping surface, such as the surface 132 for also reducing friction with the cable such as the cable A. As illustrated by the seam or line 122, the belt guide member 104 is split substantially in half lengthwise so that the cables such as the cable A can be inserted into the holes 120 and 128 since the cables A and B are endless or form a continuous uninterrupted loop. Since the belt guide member 104 is split it comprises two portions 144 and 146 which are substantially mirror images of each other. These two portions 144 and 146 are normally clamped together by respective conventional clamping members, only portions of which are shown for clarity in FIG. 6 and designated by the respective numbers 145 and 147 which contact the respective portions 144 and 146 and hold them in place.

FIG. 8 is an enlarged view of the belt drive system 92 illustrated in FIG. 1 with the hydraulic motor 90 omitted for clarity. The belt drive system 92 comprises a drive pulley 148 which is driven by the hydraulic motor 90 (not shown) and two adjacently located idler pulleys 150. As illustrated, the belt such as the belt A which is illustrated, passes around a portion of the drive pulley 148 and portions of the idler pulleys 150. The idler pulleys 150 serve the purpose of putting local tension on the portion of the belt A located adjacent to the drive pulley 148 so that belt pressure is applied to the drive pulley 148 so that it can drive the pulley A or B.

The container transport apparatus 10 is manufactured and/or used in the following manner. A bottle rinser 12 which is conventional is either manufactured or provided for retrofit. Then belt guide support members 46, 48, 50, 52, 54 and 56 are added to the frame support structure 14 and the belt guide members 104 are located at suitable locations on these belt guide support members. In addition, belt guide members are added at suitable locations to the members 16, 18, 22, 24, 26 and 28. The pulley support arm members 66 and 68 with their pulleys 58 and 62 and 94 and 96 are connected to the support structure 14 in the previously indicated manner. In a similar manner the pulley support arm members 74 and 76 and the respective housings 78 and 80 and the associated pulleys 60, 64, 86 and 88 are connected to the support structure 14 in the previously indicated manner.

A belt drive system 92 and the associated hydraulic motor is located in a conventional manner on each side of the support structure 14. The belts A and B are located in the previously indicated manner about the various pulleys 58, 62, 60, 64, 94, 96, 86 and 88 and through the belt drive systems 92. Appropriate tension is applied to the belts A and B through the use of the adjusting wheels 82 and 84. The motors 90 are then synchronized and their speed is adjusted so that the belts A and B travel at a speed that is slightly faster than the speed of the drive belt assembly 44 so that the drive belt assembly 44 will not exert any substantial force upon the containers such as the bottles 102 entering or being transmitted through the container guide means 32.

Although the invention has been described in considerable detail with reference to a certain preferred embodiment, it will be understood that variations or modifications may be made within the spirit and scope of the invention as defined in the appended claims.

What is claimed is:

1. Container transport apparatus for transporting containers comprising: container guide means for guiding said containers; container moving means associated with said container guide means for moving containers, said container moving means comprising a first movable elongated member having a portion thereof located in position to contact one side of said containers, a second movable elongated member having a portion thereof located in position to contact the opposite side of said containers and nonrotating guide members for slidably supporting said first movable elongated member located so portions of said first movable elongated member being guided contact one side of said containers; and nonrotating guide members for slidably supporting said second movable elongated member located so portions of said second movable member being guided contact the opposite side of said containers, said guide members for said first movable elongated member and said guide members for said second movable elongated member being located to alternate with each other to avoid pressure points which could occur if said guide members for said first movable elongated member were located substantially opposite said guide members for said second movable elongated member, said guide members for said first movable elongated member having a portion thereof substantially surrounding a portion of the outer circumference of said first movable elongated member, said guide members for said second movable elongated member having a portion thereof substantially surrounding a portion of the outer circumference of said second movable elongated member, said guide members being shaped to surround said elongated members to the extent that said elongated members are laterally retained by said guide members while still permitting a lateral portion of said elongated members to protrude from said guide members and contact said containers, and drive means associated with said movable elongated members for driving said movable elongated members.

2. The container transport apparatus of claim 1 wherein said containers have sides and wherein said guide members are located to cause said movable elongated members to contact the sides of said containers at points substantially on a line passing through the center of rotation of said containers.

3. The container transport apparatus of claim 2 wherein said guide members comprise two portions for permitting installation of said movable elongated members.

4. The container transport apparatus of claim 3 wherein said guide members each have an aperture for the return or non-driving portion of the associated movable elongated member.

5. The container transport apparatus of claim 4 wherein said movable elongated members have a substantially circular cross section.

6. The container transport apparatus of claim 5 wherein said guide members comprise a plastic.

7. The container transport apparatus of claim 6 further comprising means for increasing or decreasing tension on said movable elongated members.

8. The container transport apparatus of claim 7 wherein the portion of said guide members surrounding a substantial portion of the outer circumference of the associated movable elongated member has a sloping surface for reducing friction with the associated movable elongated member.

* * * * *